O. T. HUTCHISON.
COMBINED DUST PAN AND BROOM SUPPORT.
APPLICATION FILED OCT. 22, 1910.

996,341.

Patented June 27, 1911.
2 SHEETS—SHEET 1.

Witnesses
Chas. L. Griesbauer
H. F. McQuay

Inventor
O. T. Hutchison.
By Watson E. Coleman.
Attorney

O. T. HUTCHISON.
COMBINED DUST PAN AND BROOM SUPPORT.
APPLICATION FILED OCT. 22, 1910.
996,341.
Patented June 27, 1911.
2 SHEETS—SHEET 2.
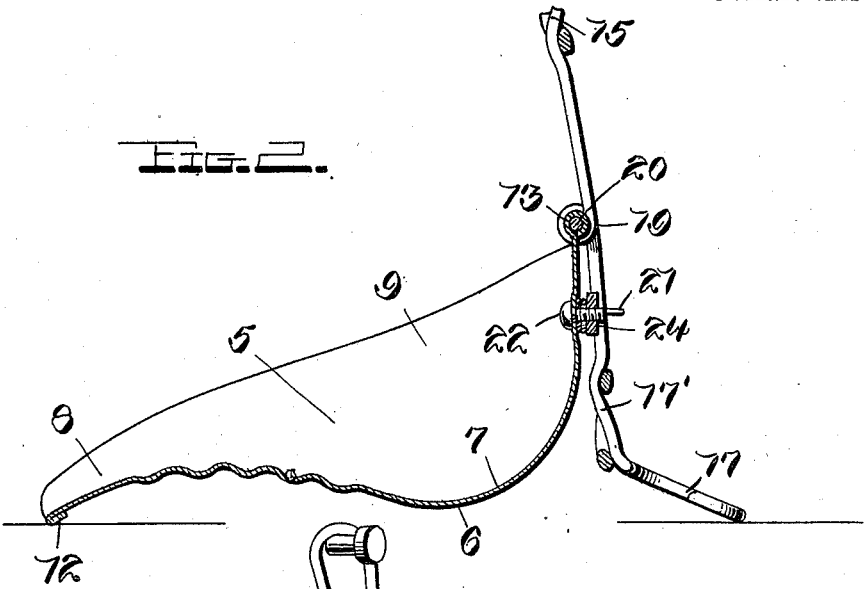
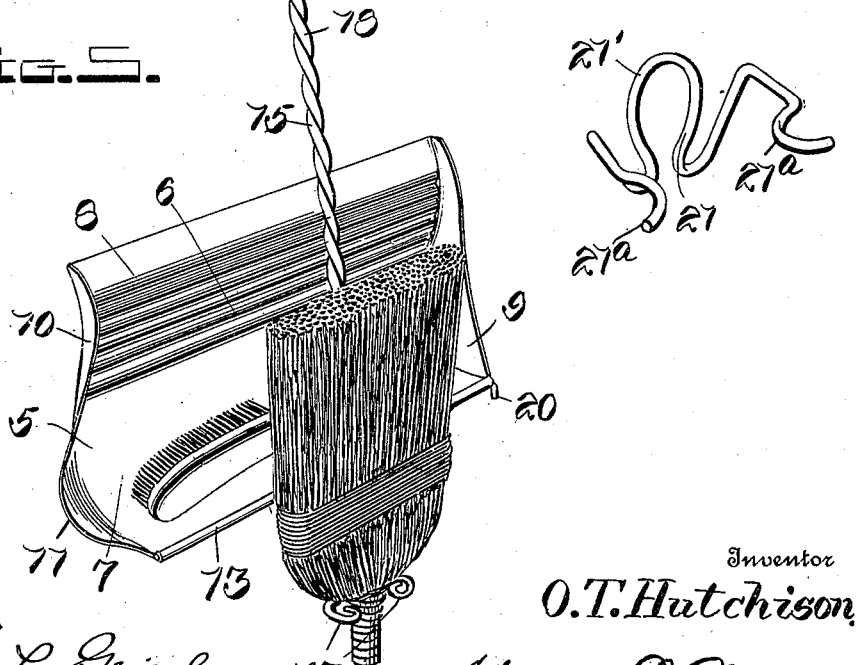
Witnesses
Chas. L. Grieslauer
H. S. McDuay
Inventor
O. T. Hutchison
By Watson E. Coleman
Attorney

UNITED STATES PATENT OFFICE.

ORVILLE T. HUTCHISON, OF DE LAND, FLORIDA, ASSIGNOR OF ONE-FOURTH TO ORVILLE B. HUTCHISON, OF DE LAND, FLORIDA.

COMBINED DUST-PAN AND BROOM-SUPPORT.

996,341.  Specification of Letters Patent.  Patented June 27, 1911.

Application filed October 22, 1910. Serial No. 588,527.

*To all whom it may concern:*

Be it known that I, ORVILLE T. HUTCHISON, a citizen of the United States, residing at De Land, in the county of Volusia and State of Florida, have invented certain new and useful Improvements in a Combined Dust-Pan and Broom-Support, of which the following is a specification, reference being had to the accompanying drawings.

This invention relates to improvements in dust pans and has for its object to provide a pan of novel construction and a detachable support for said pan whereby the same may be rigidly held in position by means of the operator's foot, thus leaving the hands free to manipulate the broom.

Another object of the invention is to provide a dust pan of such form that the dirt or sweepings will be retained therein and may be readily dumped from the pan without danger of spilling the same.

A further object of the invention is to provide means for removably attaching a handle to the pan, said handle being formed with a foot piece of such construction as to permit the ready detachment of the handle from its operative position, said foot piece providing a convenient broom support when the pan is hung up.

With the above and other objects in view, the invention consists of the novel features of construction, combination and arrangement of parts hereinafter fully described and claimed, and illustrated in the accompanying drawings, in which—

Figure 1:
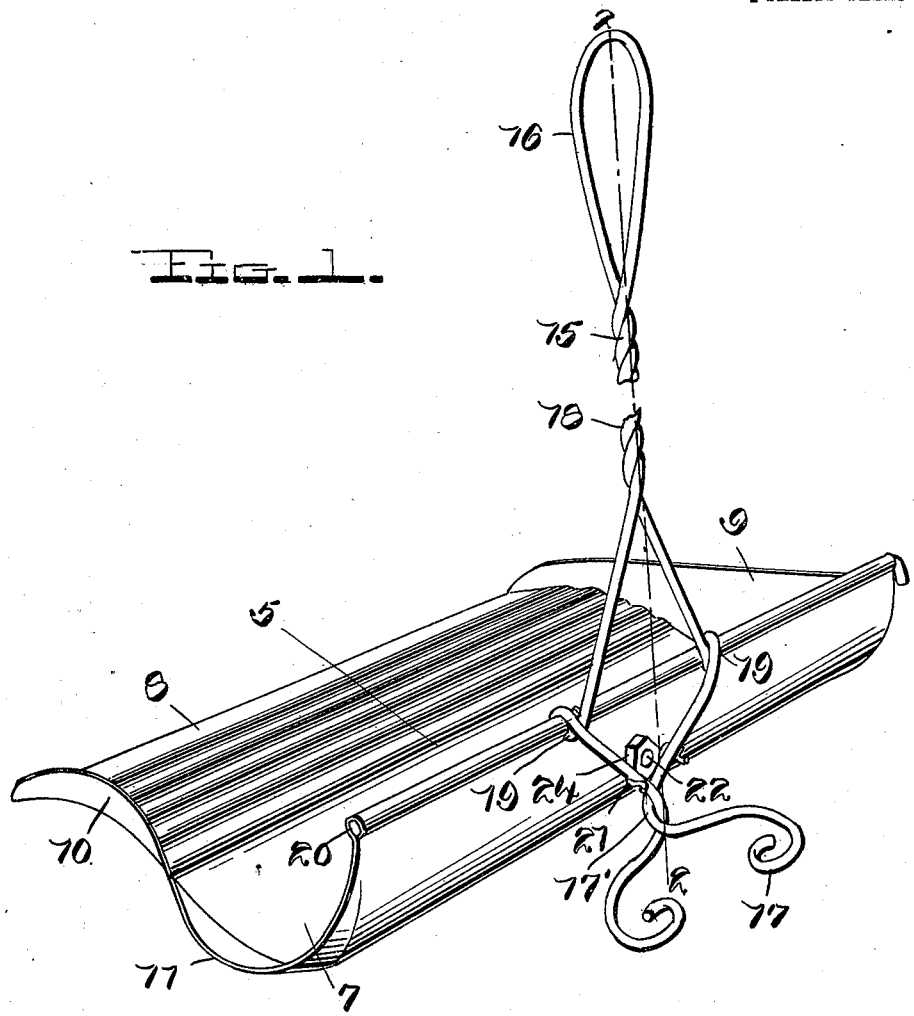
Figure 3:
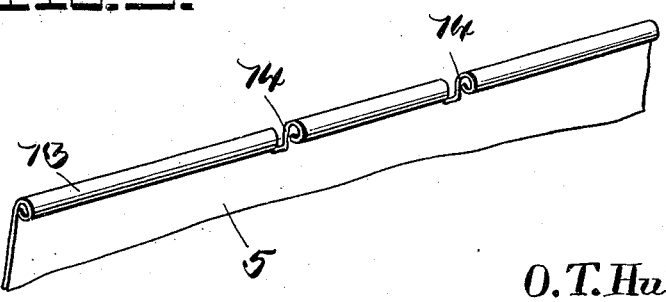

Figure 1 is a perspective view of a dust pan constructed in accordance with my invention, showing the supporting handle in its operative position; Fig. 2 is a section taken on the line 2—2 of Fig. 1; Fig. 3 is a detail perspective view of the rear edge portion of the pan, the supporting handle being removed; Fig. 4 is a similar view of the resilient locking device for the supporting member; and Fig. 5 is a perspective view showing the pan hung up and a broom supported in the foot piece of the supporting member.

Referring more particularly to the drawings 5 designates a dust pan which comprises a bottom 6 bent in the form of a reverse curve to provide a rear concave portion forming a trough 7 and a convex front edge portion 8 over which the dirt is adapted to be swept into the trough. This bottom plate of the pan would preferably be longitudinally corrugated and together with the deep trough 7 will effectually prevent all possibility of the dirt moving outwardly over the forward edge of the pan after it has been swept into the trough. A vertical wall 9 is formed at one end of the bottom plate of the pan and on the other end of said bottom an upwardly and outwardly inclined flange 10 is formed. This flange 10 is of varying height, and the rear end portion thereof in line with the trough 7 is extended laterally to form a mouth 11 from which the dirt collected in the trough is adapted to be discharged. The comparatively high front portion of the flange 10 will obviate the liability of the dirt falling over the end of the bottom plate and being spilled as it is dumped. By providing the contracted mouth at the end of the pan, the dirt may be easily dumped in a stove. The front and rear longitudinal edges are each bent upon themselves as shown at 12 and 13 respectively to provide strengthening beads. The rear beaded edge of the pan 13, has cut out portions 14 which are disposed at opposite sides of the longitudinal center thereof, the purpose of which will now be made apparent.

The handle 15 by means of which the pan is supported and carried from place to place is preferably formed from a single length of wire which is centrally formed into a loop 16 for engagement over a nail or hook whereby the pan may be hung up, and upon the ends of the wire from which the handle is formed, the laterally bent oppositely extending foot portions 17 are provided. The ends of the wire are engaged over each other adjacent to the foot portions 17, and said bent extremities of the wire are disposed laterally at an angle to the bottom of the dust pan for engagement with the floor whereby the rear edge portion of the pan is elevated and supported in spaced relation to the floor surface. The wire is twisted upon itself between the central loop therein and the pan to provide a comparatively rigid portion as indicated at 18. From this twisted portion of the wire the ends extend in opposite directions and are each formed with an eye 19, from which the end portions of the wire extend downwardly and inwardly and are bent upon themselves as indicated at 17' adjacent to the foot portions 17. The extremities of the wire handle forming the foot portions are bent inwardly toward each other and slightly spaced for a purpose which will hereinafter appear. The eyes 19 of the wire handle are adapted to be disposed in the cut out portions 14 of the rear beaded edge of the pan and a rod 20 is insertible into the bead 13 and through the eyes 19 whereby the handle is removably connected to the dust pan. This handle is securely held against pivotal movement on the rod 20 and in a vertical position with relation to the pan by means of a resilient catch 21. This catch is formed from a single length of wire having a central loop 21' and the oppositely bowed end portions 21ª the extremities of which are curved outwardly in opposite directions. A securing screw 22 extends through the loop of the wire and the back of the dust pan 5 and has a nut 24 threaded thereon whereby the catch may be rigidly secured to the pan. The lower inwardly extending portions of the wire handle are adapted to be engaged with the outturned ends of the catch 21 as said handle is moved upon the fastening rod 20. Pressure upon the lower end of the handle forces the same between the bowed portions of the catch and spreads them apart. The outcurved extremities of the wire of which the catch is formed then spring over the wire handle to hold said handle against accidental release from its vertical operative position. When it is desired to detach the handle from the back of the pan, it is simply necessary to grasp the oppositely curved foot portions 17 and press the same toward each other. The engaged portion 17' of the wire will be moved in opposite directions so that the handle may be moved outwardly and upwardly from between the bowed portions of the wire catch 21. Thus the handle may be positioned as shown in Fig. 5 over the dust pan whereby the pan may be hung up out of the way so as to occupy a minimum amount of space.

In the practical use of the invention, the operator connects the wire handle to the pan as above described and after the dirt has been swept into a pile, the pan is properly positioned. The operator places the foot upon the foot portions 17 of the wire handle which engage the floor and upon bearing lightly thereon, the forward edge of the dust pan is securely held in contact with the floor surface. This yielding pressure of the edge of the pan on the floor is obtained by reason of the arrangement of a foot support which elevates the rear portion of the pan. The dirt may now be readily swept over the forward convex edge portion of the pan into the trough portion 7 thereof, the operator having free use of both hands in the manipulation of the broom. In this manner the dirt may be more quickly and easily swept into the pan than with devices of this character as at present constructed. After the dirt has been swept up, it may be dumped into a stove or a bucket from one end of the pan through the contracted mouth 11 without spilling any portion thereof. When the pan is hung up after being used, the handle is detached from the catch device carried by the pan and the loop 16 thereof engaged over the nail or supporting hook. The handle of the broom may now be inserted between the inwardly bent foot portions 17 of the wire forming the handle, the body of said broom bearing against said wire and being supported by the foot portions thereof as clearly shown in Fig. 5. As also indicated in the drawing the dust cloth and brush may be placed in the trough portion of the pan, thus preventing the loss of any of these articles which are all adapted for use in dusting and cleaning, the whole being capable of arrangement in a comparatively small space. Also if desired the device may be utilized as a temporary shelf, the pan being suspended with the handle secured thereto in its operative position so that the pan projects from the wall. It will further be obvious that owing to the detachable connection of the handle to the pan the handle and pan may be very compactly arranged for transportation.

From the foregoing it is thought that the construction and manner of use of my improved dust pan will be readily understood. The pan itself would preferably be formed from one sheet of tin or other sheet metal and while I have described the supporting handle as being formed from one continuous length of wire, it will be understood that instead of the intermediate twisted portion 18 thereof, I may utilize a wood handle portion and fix an eye in the end thereof to support the pan in its inoperative position, the wire from which the foot support is formed being secured in the other end of the wood handle.

The device is comparatively simple in its construction and may be manufactured at a low cost. It is also very strong and durable and highly efficient in practical use.

Various other minor modifications than those above enumerated may be resorted to without departing from the essential feature or sacrificing any of the advantages of the invention.

Having thus described the invention what is claimed is:—

In combination with a dust pan, a handle pivotally connected to said pan at one edge thereof, said handle being formed from a single length of wire having a loop therein, the end portions of said wire extending in opposite directions from the pivoted portions thereof and being twisted upon themselves, the extremities of said wire then extending in opposite directions from such twisted portion and curved inwardly toward each other for engagement upon the floor to support the pan in operative position, such spaced extremities of the wire being also adapted to receive between them a broom to support the same when the pan is suspended, and a clamp to hold the handle against pivotal movement on the pan.

In testimony whereof I hereunto affix my signature in the presence of two witnesses.

ORVILLE T. HUTCHISON.

Witnesses:
D. B. TUREN,
J. J. GILLIS, Jr.

Copies of this patent may be obtained for five cents each, by addressing the "Commissioner of Patents, Washington, D. C."